United States Patent
Hirano

(10) Patent No.: US 8,958,125 B2
(45) Date of Patent: Feb. 17, 2015

(54) CALIBRATION APPARATUS FOR IMAGE FORMING APPARATUS, COMPUTER READABLE STORAGE MEDIUM STORED WITH PROGRAM FOR CALIBRATION APPARATUS, AND METHOD FOR CALIBRATING IMAGE FORMING APPARATUS

(71) Applicant: Konica Minolta, Inc., Chiyoda-ku, Tokyo (JP)

(72) Inventor: Sachiko Hirano, Hino (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/031,534

(22) Filed: Sep. 19, 2013

(65) Prior Publication Data
US 2014/0085647 A1    Mar. 27, 2014

(30) Foreign Application Priority Data
Sep. 20, 2012    (JP) .................................. 2012-207048

(51) Int. Cl.
| | | |
|---|---|---|
| G03F 3/08 | (2006.01) | |
| G06K 15/02 | (2006.01) | |
| H04N 1/60 | (2006.01) | |
| H04N 1/00 | (2006.01) | |

(52) U.S. Cl.
CPC ............ *G06K 15/027* (2013.01); *H04N 1/6041* (2013.01); *H04N 1/60* (2013.01); *H04N 1/00352* (2013.01); *H04N 1/00408* (2013.01); *H04N 1/6027* (2013.01); *H04N 1/6033* (2013.01)
USPC .............................. 358/1.9; 358/518; 382/164

(58) Field of Classification Search
USPC .............................. 358/1.9, 518; 382/162–167
See application file for complete search history.

(56) References Cited

U.S. PATENT DOCUMENTS

| | | | |
|---|---|---|---|
| 8,194,288 B2 * | 6/2012 | Wen et al. ..................... | 358/3.23 |
| 2003/0046019 A1 | 3/2003 | Kumada et al. | |
| 2010/0202005 A1 * | 8/2010 | Viturro et al. .................. | 358/1.9 |

FOREIGN PATENT DOCUMENTS

JP    2003-014544 A    1/2003

* cited by examiner

*Primary Examiner* — Barbara Reinier
(74) *Attorney, Agent, or Firm* — Holtz, Holtz, Goodman & Chick PC

(57) ABSTRACT

A calibration apparatus for an image forming apparatus includes a calculation unit for calculating a color deviation by subtracting a target value from each value on the two orthogonal axes not including brightness of a color coordinate system based on a measured color value of a printed material and a display unit for displaying the color deviation with respect to each gray balance at the feedback such that the number of times of inversions of a sign of the color deviation calculated by the calculation unit and a variation width of the color deviation when the sign of the color deviation is inverted can be detected.

30 Claims, 8 Drawing Sheets

CALIBRATION APPARATUS FOR IMAGE FORMING APPARATUS, COMPUTER READABLE STORAGE MEDIUM STORED WITH PROGRAM FOR CALIBRATION APPARATUS, AND METHOD FOR CALIBRATING IMAGE FORMING APPARATUS

CROSS-REFERENCE TO RELATED APPLICATION

This application is based on Japanese Patent Application No. 2012-207048 filed on Sep. 20, 2012, the contents of which are incorporated herein by reference.

BACKGROUND

1. Technical Field

The present invention relates to a calibration apparatus for an image forming apparatus, a non-transitory computer readable storage medium stored with program for the calibration apparatus, and a method for calibrating the image forming apparatus.

2. Description of Related Art

An entire color reproducibility accuracy evaluation in an image forming apparatus typically employs a color matching evaluation using a color difference $\Delta E$ as index. However, only the color matching using the color difference $\Delta E$ is insufficient for calibrating the image forming apparatus, and a gray balance color reproducibility accuracy (which will be called "gray balance accuracy" below) needs to be enhanced in addition to the entire color reproducibility accuracy.

On the other hand, by a feedback to a gray balance of a colorimetric value repeatedly in calibration, enhancement of a gray balance accuracy would be achieved, but even if the feedback is further repeated toward the limit of the improvement in gray balance accuracy, the gray balance accuracy lasts at the same level. Thus, other indexes for color reproducibility need to be considered in order to determine which of the gray balances obtained by multiple feedbacks is optimum.

As to a technique for calibrating an image forming apparatus, as disclosed in Unexamined Japanese Patent Publication No. 2003-14544, there are displayed a plurality of evaluation scales such as color difference obtained by a colorimetric value of a reference image and a colorimetric value of an image to be evaluated, metric value, color reproducibility indexes and color difference statistics calculated therefrom. Thereby, an accurate evaluation for total color reproducibility is enabled.

However, there is a problem that the above conventional technique is complicated because of many factors to be determined for comparing and determining multiple feedback results.

Further, if a red-stronger color deviation and a blue-stronger color deviation for a color to be originally expressed are mixed in an image, a color reproducibility with visual evaluation is worse on an actual printed material than a deviation of a color difference $\Delta E$ obtained by the numerical evaluation. However, the above conventional technique has a problem that optimum calibration is not executed in terms of inversion of the color deviation direction.

SUMMARY

The present invention has been made in order to solve the problem. That is, when determining which of the gray balances obtained by multiple feedbacks is optimum, the number of times of inversions of a sign of a color deviation and a variation width of the color deviation when the sign of the color deviation is inverted are detectably displayed for each gray balance. Thereby, a user can determine a degree of a color transition in which a color deviation direction is inverted, based on at least either the number of times of inversions of the sign of the color deviation or the variation width of the color deviation when the sign of the color deviation is inverted. Then, a gray balance with a lower degree of the color transition is applied as a gray balance of the image forming apparatus, thereby easy and accurate calibration for the image forming apparatus is achieved.

To achieve at least one of the abovementioned objects, an calibration apparatus for image forming apparatus reflecting one aspect of the present invention comprises the followings.

A calibration apparatus for an image forming apparatus which executes multiple feedbacks to a gray balance of a color value of a printed material by a correction of a color conversion processing of said image forming apparatus based on a measurement result of a color value of the printed material printed by said image forming apparatus, and executes calibration by applying the correction of said color conversion processing at any one of feedbacks to the correction of the color conversion processing of said image forming apparatus according to a selection by a user, the calibration apparatus comprising a calculation unit for calculating a color deviation by subtracting a target value from each value on the two orthogonal axes not including brightness of a color coordinate system based on a measured color value of said printed material respectively and a display unit for displaying said color deviation with respect to each gray balance at said feedback such that the number of times of inversions of a sign of said color deviation calculated by said calculation unit and a variation width of said color deviation when the sign of said color deviation is inverted can be detected.

It is preferable that said target value is a value on the two orthogonal axes not including brightness of a color coordinate system based on a color value of a step patch, and said display unit continuously displays said color deviation as a graph in order of steps of said step patch.

It is preferable that said step patch is consist of a plurality of patches in which densities of chromatic colors of the patches, where all the chromatic colors among element colors in printing by said image forming apparatus are overlapped at a constant ratio, are changed in a stepwise manner.

It is preferable that said color deviation is at least any of $\Delta a^*$ and $\Delta b^*$ of the CIELAB color space, $\Delta a$ and $\Delta b$ of the CIECAM color space, and $\Delta u^*$ and $\Delta v^*$ of the CIELUV color space.

It is preferable that said calculation unit further calculate a hue angle difference by subtracting the target value of a corresponding hue angle from each hue angles based on said measured color values respectively, and said display unit continuously displays said hue angle differences calculated by said calculation unit in order of steps of said step patch.

It is preferable that the calibration apparatus further comprising a determination unit for determining an occurrence of a color transition based on at least either the number of times of inversions of the sign of said color deviation or the variation width of said color deviation when the sign of said color deviation is inverted, wherein said display unit further displays the occurrence of said color transition when said determination unit determines the occurrence of said color transition.

It is preferable that said determination unit determines a degree of said color transition based on at least either the number of times of inversions of the sign of said color deviation or the variation width of said color deviation when the sign of said color deviation is inverted, and said display unit further displays the degree of said color transition determined by said determination unit.

It is preferable that said display unit displays said color deviation for said gray balance designated by the user from among said gray balances subjected to said feedbacks, and when said gray balance for which said color deviation is to be displayed is not designated by the user, displays said color deviation for said gray balance subjected to said last feedback.

It is preferable that said calibration includes a feedback to the gray balance of said image forming apparatus based on measurement results of color values of monochrome colors of said printed material and a feedback to the gray balance of said image forming apparatus based on measurement results of color values of overlapped chromatic colors of said printed material, and said display unit displays said color deviation for said gray balance designated by the user from among said gray balances subjected to any of feedbacks.

It is preferable that an instruction to execute a feedback to the gray balance of said image forming apparatus based on measurement results of color values of monochrome colors of said printed material and a feedback to the gray balance of said image forming apparatus based on measurement results of color values of overlapped chromatic colors of said printed material is made in one screen.

The objects, features, and characteristics of this invention other than those set forth above will become apparent from the description given herein below with reference to preferred embodiments illustrated in the accompanying drawings.

DETAILED DESCRIPTION (First Embodiment)

A calibration apparatus for an image forming apparatus, a non-transitory computer readable storage medium stores with a program for calibration apparatus, and a method for calibrating the image forming apparatus according to a first embodiment of the present invention will be described below in detail with reference to the drawings.

Figure 1:
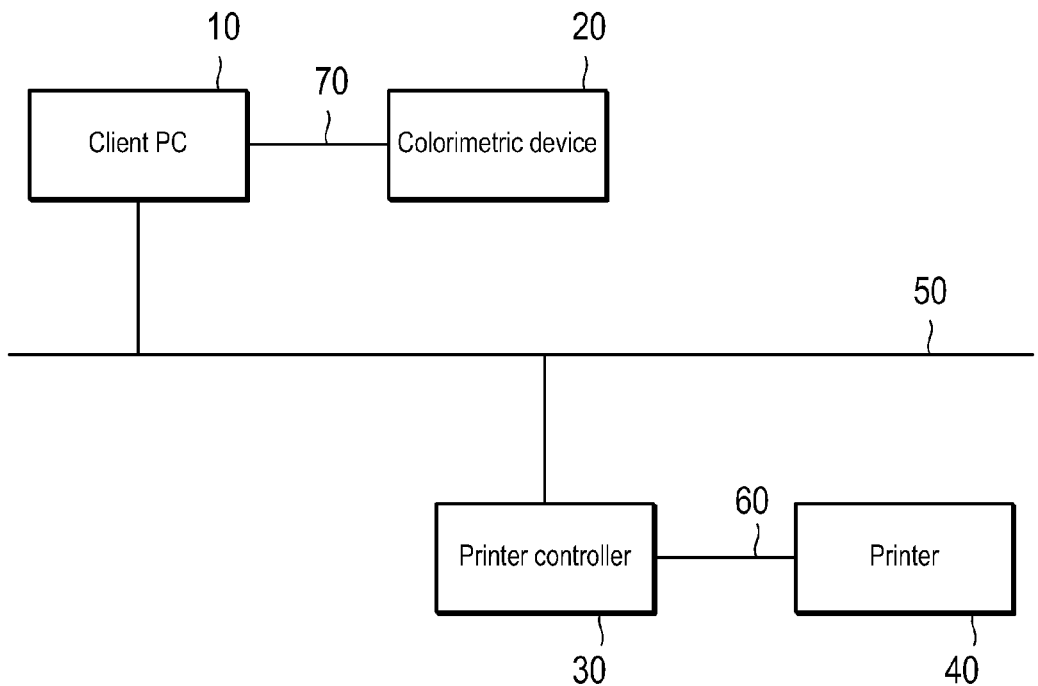
FIG. 1 is a block diagram illustrating an image forming system including a calibration apparatus according to a first embodiment of the present invention.

FIG. 1 is a block diagram illustrating an image forming system including the calibration apparatus according to the present embodiment.

The image forming system 1 comprises a client computer 10, a colorimetric device 20, a printer controller 30, and a printer 40. The client computer 10 configures the calibration apparatus according to the present embodiment. The printer controller 30 and the printer 40 configure the image forming apparatus.

The client computer 10 and the printer controller 30 are communicably connected to each other via a network 50. The network 50 can be configured by wired or wireless LAN (Local Area Network) connecting computers and network devices via Ethernet (registered trademark), BLUETOOTH (registered trademark) or IEEE802.11, or WAN (Wide Area Network) connecting LANs via a dedicated line.

The client computer 10 and the colorimetric device 20 can be connected to each other via a dedicated line 70 by Ethernet (may be also connected via USB).

The printer controller 30 and the printer 40 can be connected to each other via a dedicated line 60 such as high-speed serial bus interface based on the IEEE1394 standard. The printer controller 30 and the printer 40 may be connected to each other by Ethernet.

The types and number of devices connected to the network 50 are not limited to the example illustrated in FIG. 1. For example, the printer controller 30 and the printer 40 may be integrally configured by MFP (Multi-Function Peripheral) and connected to the network 50.

Figure 2:
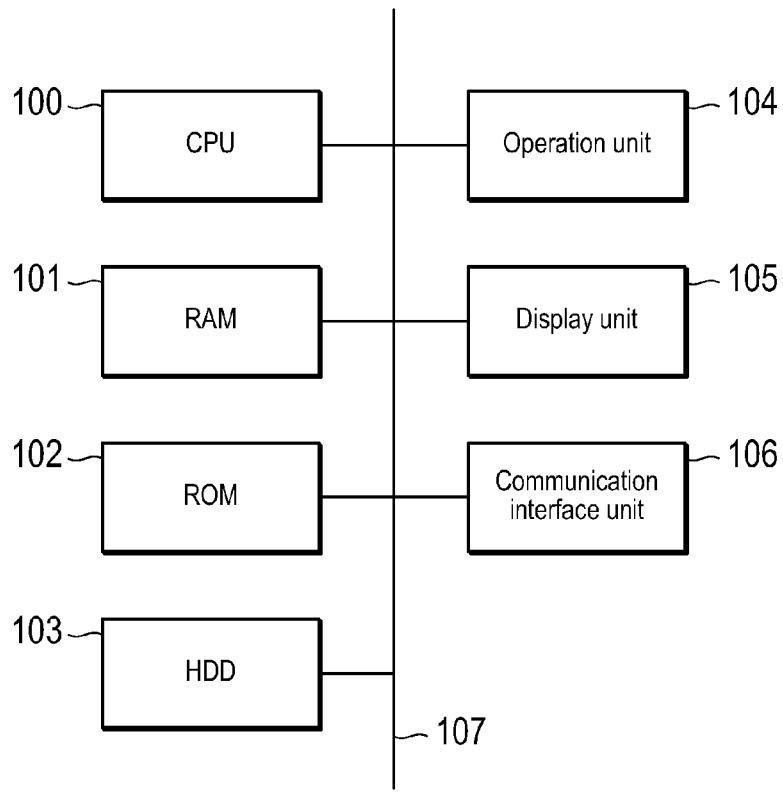
FIG. 2 is a block diagram illustrating a constitution of a client computer.

FIG. 2 is a block diagram illustrating a constitution of the client computer illustrated in FIG. 1.

As illustrated in FIG. 2, the client computer 10 comprises a CPU (Central Processing Unit) 100, a RAM (Random Access Memory) 101, a ROM (Read Only Memory) 102, a HDD 103, an operation unit 104, a display unit 105 and a communication interface unit 106, which are mutually connected via a bus 107 for exchanging signals.

The CPU 100, the RAM 100, the ROM 102 and the HDD 103 configure a calculation unit and a determination unit. The display unit 105 configures a display unit.

The CPU 100 controls the respective units and executes various calculation processings according to a program.

The RAM 101 temporarily stores therein programs or data as a work area.

The ROM 102 stores therein various programs and various kind of data.

The HDD 103 stores therein various programs including an operating system, and various kind of data.

The operation unit 104 includes a pointing device such as mouse, a keyboard, and a touch panel, which are used for various operations and input.

The display unit 105 is a liquid crystal display, for example, and displays various kind of information thereon.

The communication interface unit 106 is an interface for making communication with external devices, and may employ a network interface such as Ethernet (registered trademark), SATA (Serial Advanced Technology Attachment), PCI Express, USB, or IEEE1394, a wireless communication interface such as BLUETOOTH (registered trademark) or IEEE802.11, or a telephone line interface for connection to a telephone line.

Figure 3:
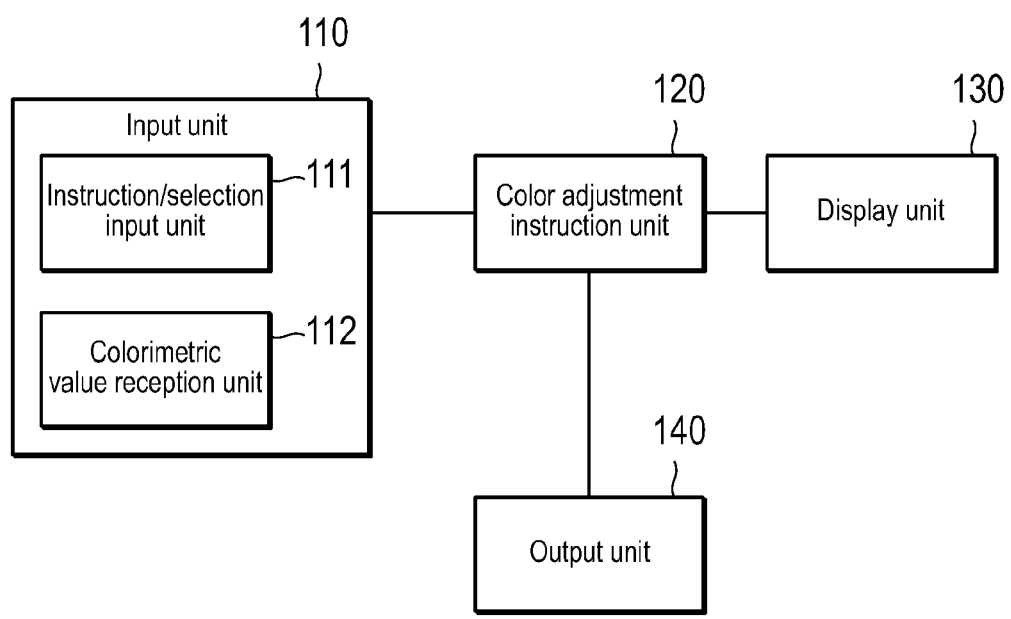
FIG. 3 is a block diagram illustrating functions of the client computer.

FIG. 3 is a block diagram illustrating functions of the client computer.

The functions of the client computer 10 illustrated in FIG. 3 can be realized by a program for a calibration apparatus stored in the HDD 103.

The functions of the client computer 10 are realized by an input unit 110, a color adjustment instruction unit 120, a display unit 130 and an output unit 140.

The color adjustment instruction unit 120 configures a calculation unit. The display unit 130 configures a display unit.

The input unit 110 comprises an instruction/selection input unit 111 and a colorimetric value reception unit 112.

The instruction/selection input unit 111 is input with a calibration instruction by the user. The instruction/selection input unit 111 transmits the input calibration instruction to the color adjustment instruction unit 120.

After correcting a color conversion table multiple times based on a measured color value (which will be called "colorimetric value") of a step patch printed by the printer 40, the instruction/selection input unit 111 is input by the user with a selection of a color deviation of a colorimetric value of the step patch at any of times of correction to be displayed on the display unit 130. The instruction/selection input unit 111 transmits the selection input by user to the color adjustment instruction unit 120.

Herein the step patch is a measurement chart for correction of a color conversion processing containing a chart which is consist of a plurality of patches in which densities of chromatic colors of patches, where all the chromatic colors among element colors of the printer are overlapped at a constant ratio, are changed in a stepwise manner. For example, if CMYK (Cyan, Magenta, Yellow, Key) are the element colors of the printer, when the ratio of CMY is 1:1:1 except for an achromatic color K, the patches configuring the step patch are from one with the densities of element colors of C=10%, M=10%, Y=10% and k=0% to one with C=100%, M=100%, Y=100% and k=0%.

The step patch includes a chart made of a plurality of patches in which a density of a monochrome patch is changed in a stepwise manner.

A color deviation is a difference between a calorimetric value and a target value of the step patch.

Herein, the target value is a target color value of a printed material printed by the printer 40. The target value may employ numerical data of the target color value, and may employ a colorimetric value of the step patch having the target color value of the printed material to be printed.

Further, after feedbacks to the gray balance are executed by correcting the color conversion table multiple times based on the measured color value, the instruction/selection input unit 111 is input with a selection as to one of gray balances at any of times of correction to be applied to a gray balance on a correction to a color conversion processing by the printer controller 30. The instruction/selection input unit 111 transmits the selection input by the user to the color adjustment instruction unit 120.

The colorimetric value reception unit 112 receives the colorimetric value of the step patch printed by the printer 40 from the colorimetric device 20.

When receiving the calibration instruction from the instruction/selection input unit 111, the color adjustment instruction unit 120 starts executing calibration. Calibration is executed by the following operations.

(1) The color adjustment instruction unit 120 instructs the printer controller 30 to color-convert the step patch by the color conversion processing using the color conversion table, and to print the color-converted step patch from the printer 40.

(2) The user measures colors of the step patch printed by the printer 40 by the colorimetric device 20, and transmits the colorimetric value of the step patch from the color measurement device 20 to the client computer 10.

(3) The color adjustment instruction unit 120 calculates a color deviation by subtracting the target value from the colorimetric value of the step patch received via the instruction/selection input unit 111, and transmits the calculated color deviation to the display unit 130 for display.

(4) The color adjustment instruction unit 120 or the user corrects the color conversion table such that the color difference $\Delta E$ is smaller.

(5) (1) to (4) are repeated multiple times thereby to execute feedbacks for correcting the color conversion table multiple times based on the colorimetric value of the step patch.

(6) The color adjustment instruction unit 120 registers the color conversion table at a correction, which is selected by the user from among the color conversion tables corrected by the feedbacks, in the printer controller 30 via the output unit 130, and applies it as a color conversion table used for the color conversion processing.

In (6), after the color conversion table is corrected based on the calorimetric value of the step patch multiple times, the color adjustment instruction unit 120 receives, from the instruction/selection input unit 111, a selection of the color deviation of the colorimetric value of the step patch at any of times of a correction to be displayed on the display unit 130. The color adjustment instruction unit 120 displays the color deviation at times of a correction selected by the user on the display unit 130.

After the color conversion table is corrected multiple times, the color adjustment instruction unit 120 receives a selection of the color conversion table at any of times of a correction to be applied to the color conversion processing by the printer controller 30.

Thereby, the user can determine the color conversion processing by the color conversion table at any of times of a correction to be applied to the printer controller 30 based on a degree of a color transition in which a direction of the color deviation of the colorimetric value of the step patch is inverted. That is, the user can correct the color conversion processing by the printer controller 30 such that a gray balance with a lower degree of the color transition can be printed.

The display unit 130 displays various kind of data such as the color deviation based on an instruction of the color adjustment instruction unit 120.

The output unit 140 transmits various instructions and various kind of data to the printer controller 30 based on an instruction of the color adjustment instruction unit 120.

Figure 4:
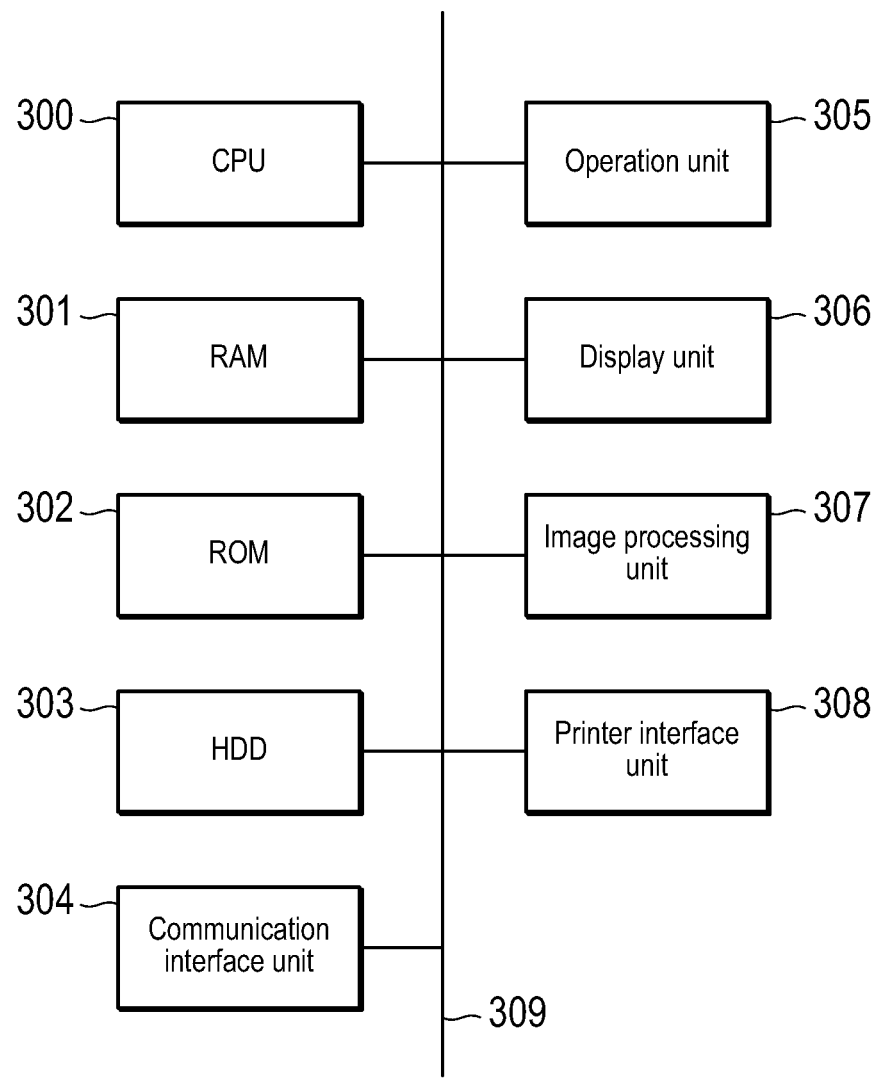
FIG. 4 is a block diagram illustrating a constitution of a printer controller.

FIG. 4 is a block diagram illustrating a constitution of the printer controller.

The printer controller 30 comprises a CPU 300, a RAM 301, a ROM 302, a HDD 303, a communication interface unit 304, an operation unit 305, a display unit 306, an image processing unit 307 and a printer interface unit 308, which are mutually connected via a bus 309 for exchanging signals.

The operations of the CPU 300, the RAM 301, the ROM 302, the HDD 303 and the communication interface unit 304 are the same as the corresponding components of the client computer 10, respectively, therefore, a repeated explanation thereof will be omitted.

The HDD 303 stores a color conversion table which is instructed to register by the client computer 10 from among the color conversion tables corrected by the feedbacks based on the colorimetric value of the step patch, and registers it as a color conversion table used for the color conversion processing. The HDD 303 can further store the color conversion table at each correction by the feedbacks executed multiple times based on the colorimetric value of the step patch for calibration.

The image processing unit 307 executes a rasterization processing of converting print data received from the client computer 10 into image data in a bitmap form. The rasterization processing includes a language analysis processing, a color conversion processing and a screen processing.

Herein, the language analysis processing is a processing for interpreting PDL (Page Description Language) data as print data and converting it into intermediate data called DisplayList. The intermediate data may be generated per object or may be generated in units of band.

The color conversion processing is a process for converting a color space of the intermediate data generated by the language analysis processing into a color space for output.

A color of the intermediate data may be designated by the CMYK color space.

The color conversion processing uses a color conversion table. The color conversion table can be described by use of the ICC (International Color Consortium) profile, for example.

The screen processing is a processing for binarizing the color-converted intermediate data, and one page of bitmap data is generated by the screen processing.

The printer interface unit 308 is an interface for making communication with the locally-connected printer 30.

The bitmap data as image data and an instruction for a print output method are transmitted from the printer interface unit 308 to the printer 40.

Figure 5:
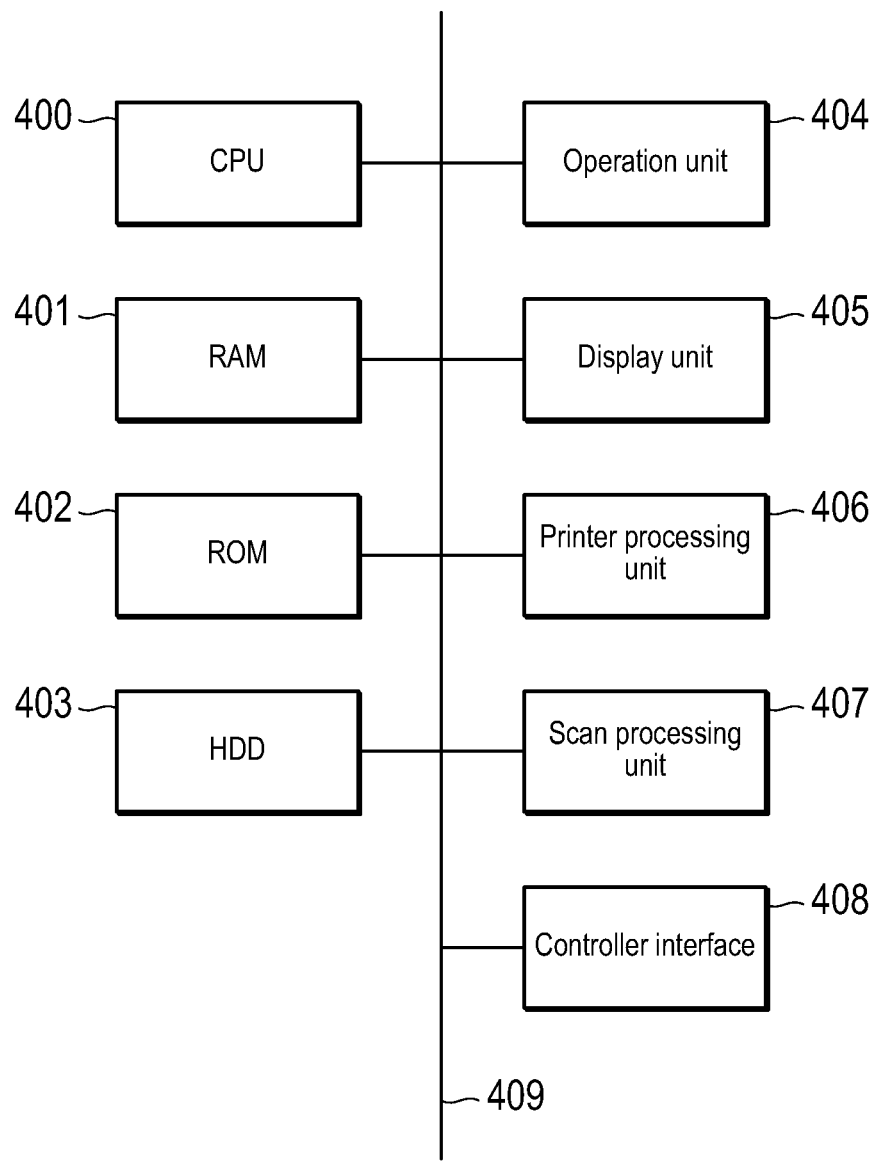
FIG. 5 is a block diagram of a constitution of a printer.

FIG. 5 is a block diagram illustrating a constitution of the printer.

The printer 40 comprises a CPU 400, a RAM 401, a ROM 402, a HDD 403, an operation unit 404, a display unit 405, a print processing unit 406, a scan processing unit 407 and a controller interface unit 408, which are mutually connected via a bus 409 for exchanging signals.

The operations of the CPU 400, the RAM 401, the ROM 402, the HDD 403, the operation unit 404 and the display unit, 405 are the same as the corresponding components in the client computer 10, and thus a repeated explanation thereof will be omitted.

The print processing unit 406 uses a well-known image forming process such as electrophotographic process to print an image based on the image data received from the printer controller 30 on a storage medium such as sheet based on an instruction for the print output method received from the printer controller 30. The printing can be executed by use of the CMYK as element colors.

The scan processing unit 407 irradiates a light from a light source such as fluorescent lamp on a document set on a predetermined reading position on a document table or a document carried to a predetermined reading position by ADF (Auto Document Feeder), and receives its reflected light while scanning it by a light receiving device such as CCD (Charge Coupled Device) image sensor or CMOS (Complementary Metal Oxide Semiconductor) image sensor, thereby generating digital data of the document image.

The controller interface unit 408 is an interface for making communication with the locally-connected printer controller 30.

The colorimetric device 20 measures a color value of a predetermined portion of the printed material output from the printer 40, and transmits the measured color value to the client computer 10.

The color measurement device 20 may not transmit the color value itself, and may transmit spectral reflectivity data to the client computer 10 such that the client computer 10 calculates a color value based on the spectral reflectivity data.

Figure 6:
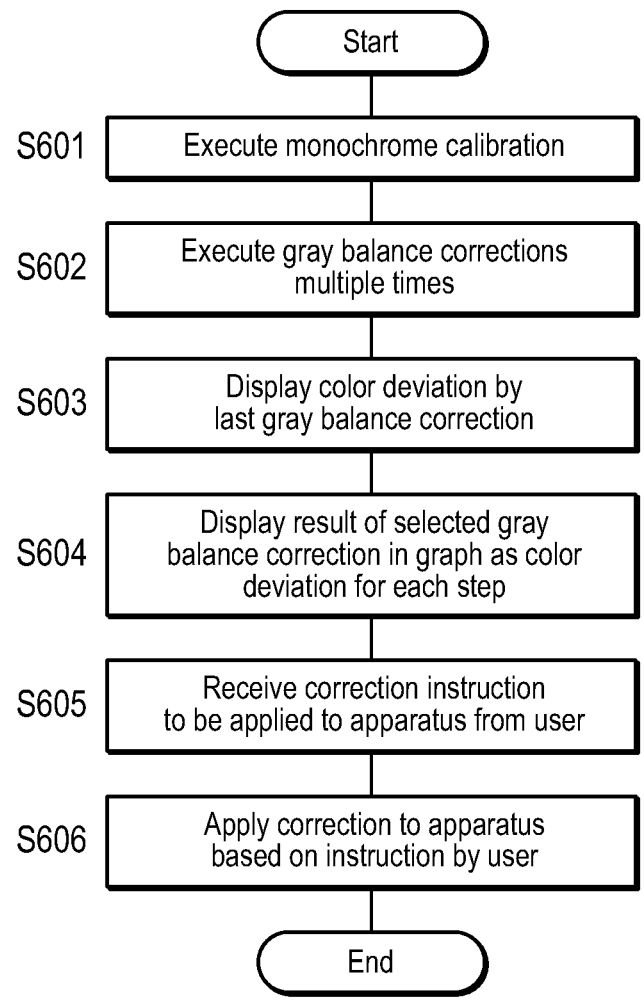
FIG. 6 is a diagram illustrating a flowchart of a method for calibrating an image forming apparatus according to the first embodiment of the present invention.

FIG. 6 is a diagram illustrating a flowchart for a method for calibrating the image forming apparatus according to the present embodiment. The flowchart may be executed by a program stored in the HDD 103 of the client computer 10.

When the program is activated in the client computer 10, a calibration manager screen is displayed on the display unit 105 of the client computer 10.

Figure 7:
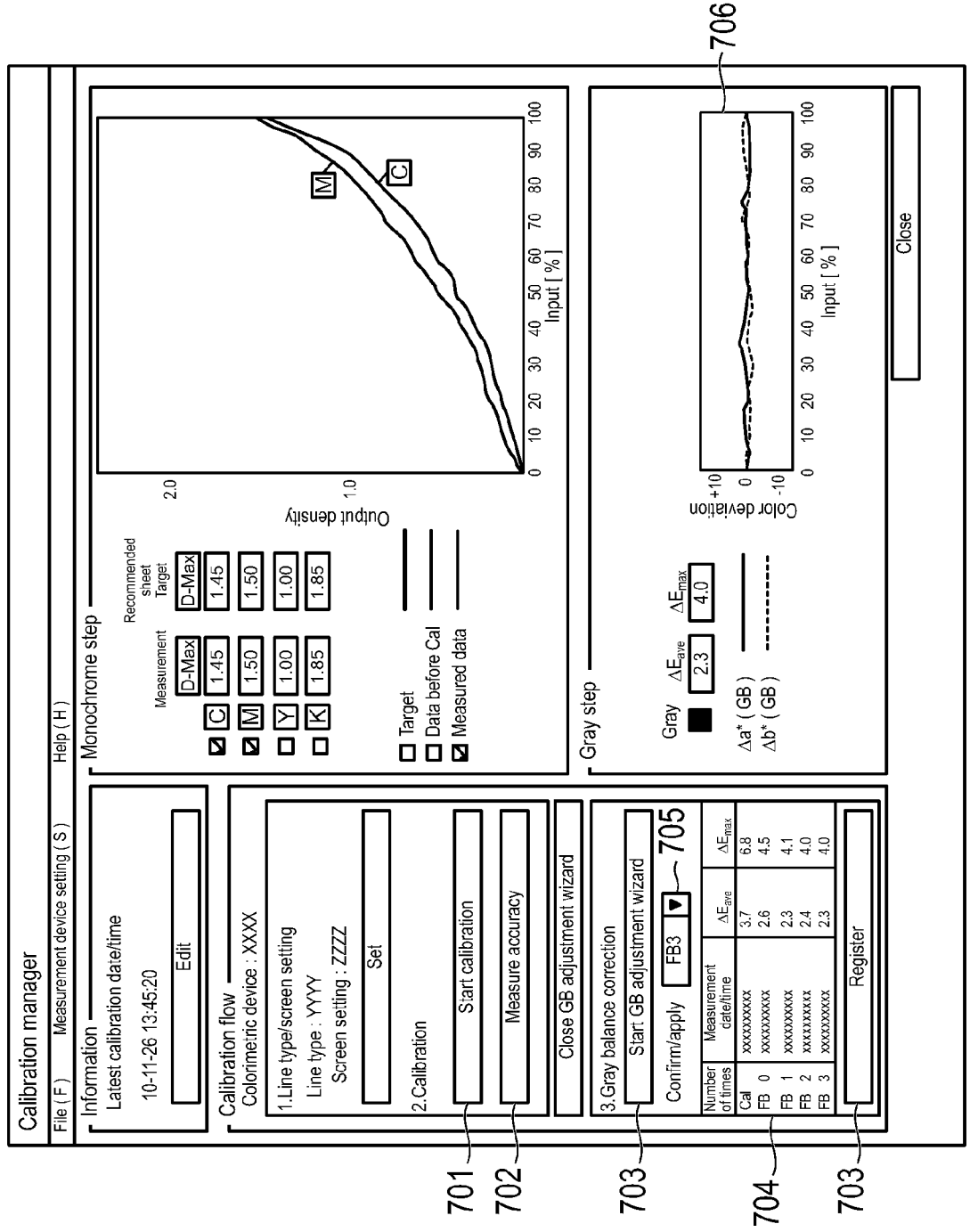
FIG. 7 is a diagram illustrating a calibration manager screen.

FIG. 7 is a diagram illustrating the calibration manager screen. As illustrated in FIG. 7, the calibration manager screen has areas for displaying "information", "calibration flow", "monochrome step" and "gray step", respectively. A latest date on which the calibration has been executed is displayed in the "information" area. In the "calibration flow" area various instructions by the user as for sheet type/screen setting, monochrome calibration, and gray balance calibration are input, and displays therein an average color difference ΔEave and a maximum color difference ΔEmax at each time of multiple calibrations, etc. The "monochrome step" area displays therein a measured color value after monochrome calibration, and the like. The "gray step" area displays therein, a color deviation calculated from the colorimetric value after gray balance calibration, etc.

When a "start calibration" button 701 in the calibration manager screen is pressed by the user, the client computer 10 operates to induce the user to execute monochrome calibration (S601).

When the "start calibration" button 701 is pressed, the step patch is printed by the printer 40 based on an instruction of the client computer 10. The user makes a color measurement of the printed step patch by the color measurement device 20, and transmits a colorimetric value from the colorimetric device 20 to the client computer 10.

The client computer 10 calculates a correction value based on a difference between a colorimetric value of a monochrome step patch among the colorimetric values of the step patch received from the color measurement device 20 and a target value, and corrects the color conversion table of the printer controller 30 by the calculated correction value. The color conversion table can be corrected based on the colorimetric value of the monochrome step patch such that a density of each step of the monochrome step patch is closer to a density of each step of the target value after the color conversion by the color conversion table. In this way, the color conversion table is corrected based on the colorimetric value of the monochrome step patch so that monochrome calibration is executed.

Then, when a "measure accuracy" button 702 is pressed by the user, the step patch which has been color-converted by the color conversion table subjected to monochrome calibration is printed by the printer 40. The user makes a color measurement of the printed step patch by the colorimetric device 20, and transmits the colorimetric value from the colorimetric device 20 to the client computer 10.

When the colorimetric value of the step patch is received by the client computer 10, the "monochrome step" area displays therein the chart of the density for each step of the monochrome step patch after monochrome calibration as to any color of CMYK based on the user selection. The client computer 10 subtracts the target value from the values of a* and b* of the CIELAB color space, respectively, based on the colorimetric values of the step patch, thereby calculating the color deviations $\Delta a^*$ and $\Delta b^*$. The calculated color deviations $\Delta a^*$ and $\Delta b^*$ are continuously displayed in the "gray step" area as a graph 706 in order of steps of the step patch.

Any color deviation displayed in the graph 706 may be calculated by subtracting the target value from the values on the two orthogonal axes not including brightness of the color coordinate system based on the colorimetric values. For example, the color deviations $\Delta a$ and $\Delta b$ may be calculated by subtracting the target value from the values of a and b of the CIECAM color space based on the colorimetric values. Further, the color deviations $\Delta u^*$ and $\Delta v^*$ may be calculated by subtracting the target value from the values of u* and v* of the CIELUV color space based on the colorimetric values.

The abscissa axis of the graph 706 indicates a numerical value of data input into the colorimetric device 20, and specifically indicates a density common in chromatic colors overlapped at a constant ratio in each step patch to be measured by the color measurement device 20. The ordinate axis of the graph 706 indicates the values of the color deviations $\Delta a^*$ and $\Delta b^*$.

With reference to the graph 706, the user can detect the number of inversions of a sign of the color deviation, and a variation width of the color deviation when the sign of the color deviation is inverted, and can grasp a degree of the color deviation based on at least either the number of inversions of the sign of the color deviation, or the variation width of the color deviation when the sign of the color deviation is inverted.

The "gray step" area may continuously display therein a hue angle difference calculated by subtracting a target value of a corresponding hue angle from a hue angle based on a colorimetric value of the step patch in order of steps of the step patch. Since a color close to an achromatic color has a property that the hue angle has a larger difference than a small difference of a visual color, the hue angle difference is displayed so that the degree of the color deviation can be detected with a higher accuracy.

When a "start GB adjustment wizard" button 703 in the calibration manager screen is pressed by the user, the client computer 10 operates to induce the user to execute gray balance calibration (S602).

When the "start GB adjustment wizard" button 703 is pressed, the step patch is printed by the printer 40 based on an instruction of the client computer 10. The user makes a color measurement of the printed step patch by the colorimetric device 20, and transmits a colorimetric value from the colorimetric device 20 to the client computer 10.

The client computer 10 calculates a correction value based on a difference between the colorimetric value of the step patch received from the colorimetric device 20 and the target value, and corrects the color conversion table of the printer controller 30 by the calculated correction value. The color conversion table can be corrected such that a value of the average color difference $\Delta Eave$ and a value of the maximum color difference $\Delta Emax$ are much smaller based on the gray balance of the colorimetric value of the step patch and the target value. In this way, the color conversion table is corrected based on the gray balance of the colorimetric value of the step patch so that correction of the gray balance (which will be called "gray balance correction" below) as correction of the color conversion processing is made.

The gray balance correction is made multiple times. The number of gray balance corrections is desirably three to five in consideration of a gray balance accuracy and the number of steps.

When the multiple gray balance corrections are terminated, the client computer 10 displays a view as for each gray balance correction in a correction list 704 in the "calibration flow" area. The correction list 704 displays therein the number of times for corrections, a date/time, the value of the average color difference $\Delta Eave$, and the value of the maximum color difference $\Delta Emax$ for each gray balance correction. The graph 706 displays therein a color deviation graph as a result of the last gray balance corrections (S603). At this time, "FB 3", which is the number of last gray balance corrections, is selected in a pull-down menu 705 for selecting a color deviation in a gray balance subjected to gray balance correction at any one of times. Herein, "FB" among the symbols indicating the number of times indicates a feedback by gray balance correction, and a number indicates the number of gray balance corrections in the correction list 704 ("FB 0" indicates that a gray balance correction is made but no feedback is executed).

The client computer 10 displays, as a color deviation graph, the results of gray balance corrections at a number of times selected by user in the pull-down menu 705 (S604). The user can display, as the color deviation graph, the results of monochrome calibration by selecting the number of times for corrections "Cal" in the pull-down menu 705.

When a "register" button 707 is pressed by the user while the number of times for corrections is being selected in the pull-down menu 705, the client computer 10 applies the correction of the color conversion table by the gray balance corrections at the selected number of times for corrections to the color conversion table of the printer controller 30 (S606).

Figure 8:
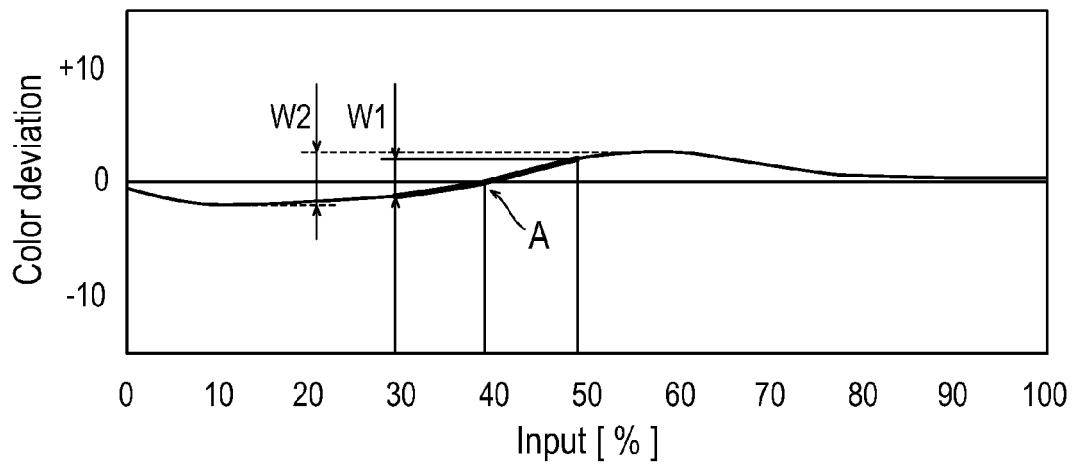
FIG. 8 is an explanatory diagram illustrating a color deviation graph in which the number of times of inversions of a sign of a color deviation and a variation width of the color deviation when the sign of the color deviation is inverted are detectably displayed.

FIG. 8 is an explanatory diagram illustrating a color deviation graph in which the number of inversions of a sign of a color deviation and a variation width of the color deviation when the sign of the color deviation is inverted are detectably displayed.

In the example illustrated in FIG. 8, only a point A in the figure is where the sign of the color deviation is inverted in the color deviation graph. Thus, in this example, it can be detected that the number of inversions of the sign of the color deviation is 1. In the graph, it can be detected that a variation width of the color deviation in a step width of 10% before and after the point A where the sign of the color deviation is inverted is W1. Thus, the variation width of the color deviation when the sign of the color deviation is inverted is defined as a variation width of the color deviation in the step width of 10% before and after the point where the sign of the color deviation is inverted, thereby detecting the variation width of the color deviation when the sign of the color deviation is inverted. The variation width of the color deviation when the sign of the color deviation is inverted may be defined as a difference between the negative and positive peak values before and after the point where the sign of the color deviation is inverted. The variation width of the color deviation when the sign of the color deviation is inverted may be defined as an absolute value of a difference in color deviation between two different negative and positive step patches just before and just after the sign of the color deviation by the step of the step patch is inverted.

The number of times of inversions of the sign of the color deviation indicates the number of color transitions, and the variation width of the color deviation when the sign of the color deviation is inverted indicates a magnitude of each color transition. Thus, a degree of the color transition can be evaluated based on at least either the number of times of inversions of the sign of the color deviation or a variation width of the color deviation when the sign of the color deviation is inverted. As the degree of the color transition is higher, the color reproducibility in visual evaluation is deteriorated.

Thus, the color conversion table for giving a gray balance with a lower degree of the color transition is applied to the color conversion table of the printer controller, thereby easily and accurately executing calibration for enhancing color reproducibility in visual evaluation.

When a degree of the color transition is determined based on both the number of times of inversions of the sign of the color deviation and a variation width of the color deviation when the sign of the color deviation is inverted, the degree of the color transition can be determined by the following operations, for example.

(1) For the color transition with the different signs of the color deviations of the colorimetric values of two adjacent step patches by the step of the step patch, an absolute value of the difference in color deviation between the adjacent step patches is calculated as a magnitude of the color transition.

(2) For the color transition with a color deviation of 0 of the middle step patch and the different signs of the color deviations of the first and third step patches as for the color deviations of the colorimetric values of the three adjacent step patches by the step of the step patch, half an absolute value of the difference in color deviation between the first and third step patches is calculated as a magnitude of the color transition.

(3) A total sum of the numerical values calculated in (1) and (2) at all the positions where the color transition occurs is calculated and assumed as a degree of the color transition.

For example, when the color deviation calculation results are the numerical values shown in Table 1, the degree of the color transition is calculated as follows.

TABLE 1

| Input | 0 | 5 | 10 | 15 | 20 | 25 | 30 | 35 | 40 | 45 | 50 | 55 | 60 | 65 | 70 | 75 | 80 | 85 | 90 | 95 | 100 |
|---|---|---|---|---|---|---|---|---|---|---|---|---|---|---|---|---|---|---|---|---|---|
| $\Delta a^*$ | 0 | −1 | −1 | −1 | 0 | 2 | 3 | 3 | 3 | 3 | 2 | 2 | 2 | 2 | 3 | 3 | 3 | 2 | 1 | 1 | 0 |
| $\Delta b^*$ | 0 | −0.5 | −1 | −1 | −1 | −1 | −1.5 | −1.5 | −1 | −1 | −1 | −1 | −1 | 0 | 1 | 1 | 2 | 2 | 1 | 1 | 0 |

For the color deviation $\Delta a^*$, the color transition occurs at the inputs 15% to 25%, and the magnitude of the color transition is calculated as $2-(-1)*0.5=1.5$. For the color deviation $\Delta b^*$, the color transition occurs at the inputs 60% to 70%, and the magnitude of the color transition is calculated as $1-(-1)*0.5=1$. Thus, a degree of the color transition is calculated as $1.5+1=2.5$.

Table 2 shows evaluation indexes by which the degree of the color transition is staged based on the calculated degree of the color transition.

TABLE 2

| Total sum = 0 | No color transition |
| 0 < total sum ≤ 1 | Color transition (low) |
| 1 < total sum ≤ 3 | Color transition (middle) |
| 3 < total sum | Color transition (high) |

The degree of the color transition is calculated at 2.5 based on the color deviation calculation results in Table 1. Thus, the degree of the color transition in this example is evaluated as middle color transition in Table 2.

(Working Example)

A working example of the present embodiment will be described.

The image forming apparatus is calibrated to give the gray balance with a different degree of the color transition, and a photograph image color-converted by the color conversion table subjected to each calibration is used to visually evaluate color matching.

[Conditions and Methods]

Figure 9A:
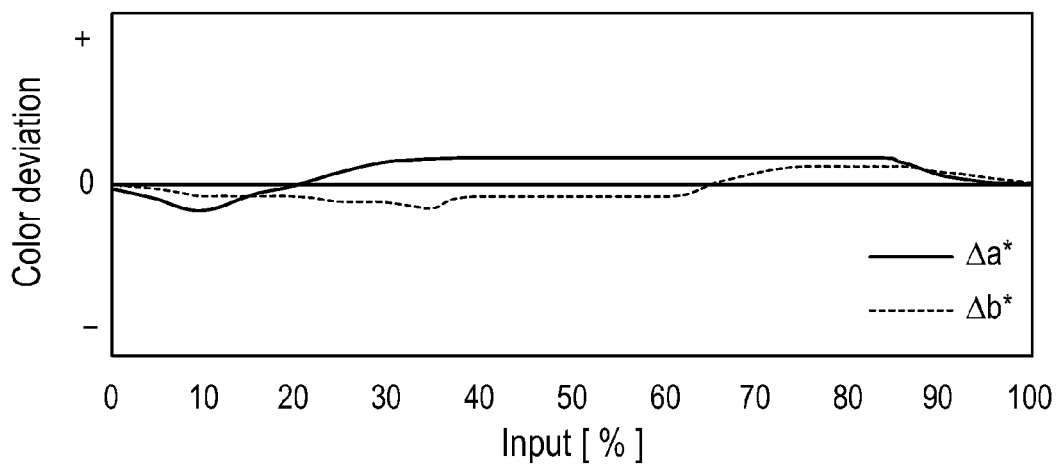
FIGS. 9A and 9B are diagrams illustrating color deviation graphs of gray balances according to a comparative example and a working example.
Figure 9B:
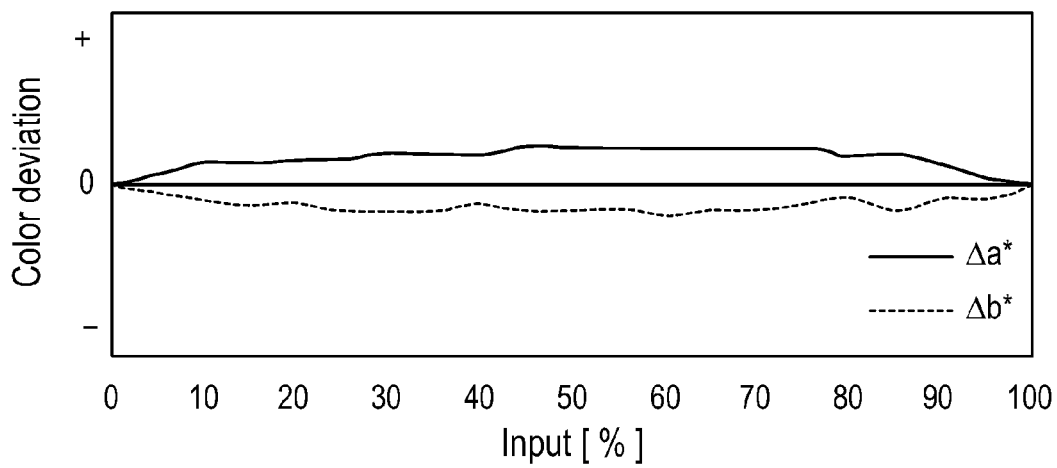

1. A gray balance correction and multiple feedbacks were executed after monochrome calibration. FIGS. 9A and 9B are diagrams illustrating the color deviation graphs of the gray balances at the number of times for feedbacks A and at the number of times for feedbacks B. FIG. 9A is the color deviation graph in a comparative example with the color transition, and FIG. 9B is the color deviation graph in the working example with no color transition.

2. Several typical photograph images color-converted by two color conversion tables for giving a gray balance with a color deviation illustrated in FIGS. 9A and 9B were printed.

3. Five experiences of printed material's color adjustment compared the printed photographs and the target and visually evaluate color matching.

4. The visual evaluation was made in two terms of apparent similarity and preference (absence of strangeness) between the photograph images and the target.

5. The visual evaluation for similarity was made by a point system of the 5 point scale with 5 for completely match, 3 for lower limit of practically-usable, and 2 or less for unusable.

6. The visual evaluation for preference was made by a point system of the 5 point scale with 5 for preferable, 3 for lower limit of practically-usable, and 2 or less for unusable.

[Results]

Table 3 shows that the visual evaluation of the color matching of the photograph image in the gray balance with no color transition was compared with the visual evaluation of the color matching of the photograph image in the gray balance with the color transition.

TABLE 3

| Number of times for feedbacks | Presence of color transition | $\Delta E_{\downarrow ave \downarrow}$ | $\Delta E_{\downarrow max \downarrow}$ | Similarity | Preference |
|---|---|---|---|---|---|
| A (Comparative example) | Present | 2.47 | 4.02 | 3.6 | 3.2 |
| B (Working example) | Absent | 3.26 | 4.33 | 3.6 | 3.8 |

The comparative example (calibration A) was better in the color difference $\Delta E$ for evaluating the total color reproducibility accuracy, but the example (calibration B) was better in the visual evaluation in terms of preference. No difference in evaluation was observed in terms of similarity between the working example and the comparative example.

According to the present working example, it is demonstrated that the color conversion processing is corrected to eliminate the color transition in the gray balance of a printed material, thereby obtaining a preferable visual evaluation.

There have been described above the calibration apparatus for the image forming apparatus, the non-transitory computer readable storage medium recorded with the program for the calibration apparatus, and the method for calibrating the image forming apparatus according to the first embodiment of the present invention. The present embodiment has the following effect.

When determining which of a plurality of gray balances obtained by feedbacks on a gray balance based on a colorimetric value is optimum, a color deviation for each gray balance is displayed so as to detect the number of times of inversions of the sign of the color deviation and the variation width of the color deviation when the sign of the color deviation is inverted. Thereby, the user can determine the degree of the color transition based on at least either the number of times of inversions of the sign of the color deviation or the variation width of the color deviation when the sign of the color deviation is inverted. The gray balance with a lower degree of the color transition is applied as a gray balance of the image forming apparatus, thereby easy and accurate calibration for the image forming apparatus is achieved.

(Second Embodiment)

A calibration apparatus for an image forming apparatus, a non-transitory computer readable storage medium recoded with the program for the calibration apparatus, and a method for calibrating the image forming apparatus according to a second embodiment of the present invention will be described below in detail with reference to the drawings.

The present embodiment is different from the first embodiment in the following point. That is, according to the present embodiment, a position where the sign of a color deviation is inverted in the color deviation graph based on the colorimetric value is detected and is displayed. The present embodiment is the same as the first embodiment in other points, therefore their explanation will be omitted.

Figure 10:
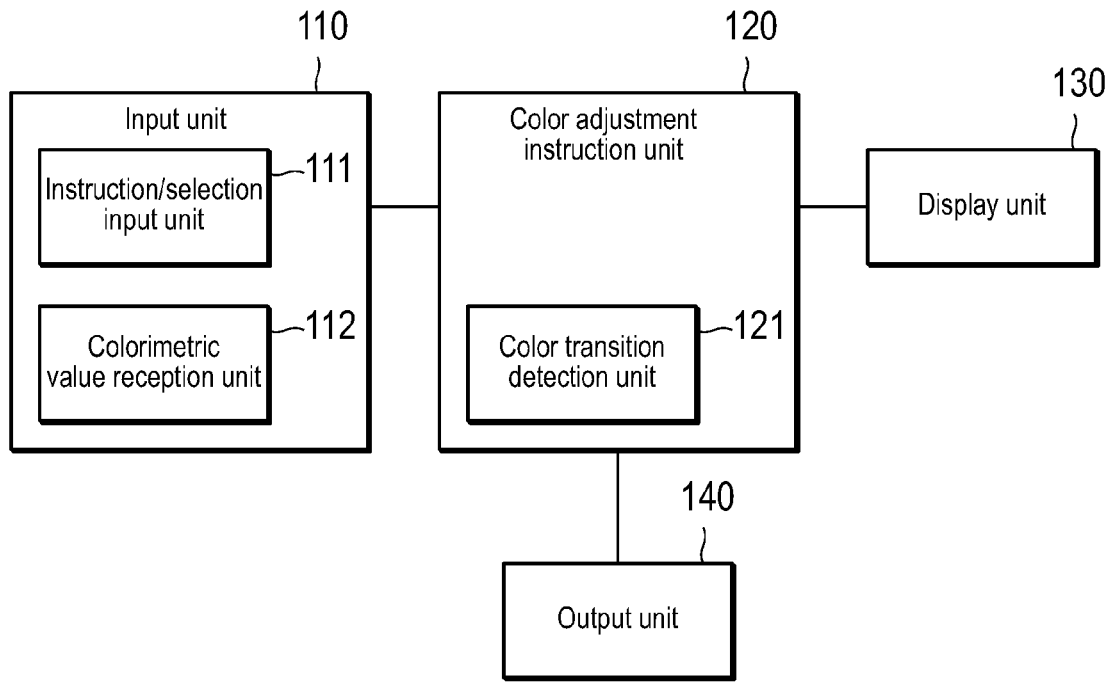
FIG. 10 is a block diagram illustrating functions of a client computer configuring a calibration apparatus according to a second embodiment of the present invention.

FIG. 10 is a block diagram illustrating the functions of the client computer.

In the present embodiment, the color adjustment instruction unit 120 further comprises a color transition detection unit 121. The color transition detection unit 121 configures a determination unit.

The color transition detection unit 121 detects where the sign of the color deviation is inverted based on the numerical value of the color deviation calculated by the color adjustment instruction unit 120, and instructs the display unit 130 to display the detected positions on the color deviation graph.

The display unit 130 displays where the sign of the color deviation is inverted as the position where a color transition occurs in the color deviation graph in response to an instruction by the color transition detection unit 121.

Figure 11:
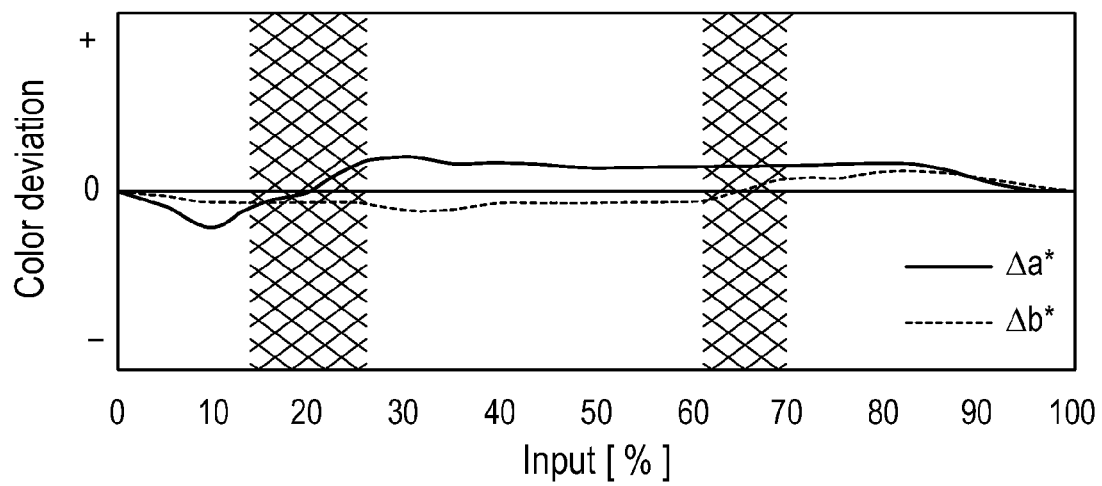
FIG. 11 is an explanatory diagram illustrating positions where the sign of a color deviation is inverted in a color deviation graph displayed on a display unit of the client computer.

FIG. 11 is an explanatory diagram illustrating that the positions where the sign of the color deviation is inverted are indicated in the color deviation graph displayed on the display unit in the client computer.

As illustrated in FIG. 11, the positions where the sign of the color deviation is inverted are indicated in meshed bands, and thus the occurrences of the color transitions are indicated.

A magnitude of the variation width of the color deviation when the sign of the color deviation is inverted is preferably further indicated in the color deviation graph. The magnitude of the variation width of the color deviation when the sign of the color deviation is inverted may be indicated by a numerical value, or may be indicated in a graphic whose area increases depending on the magnitude. The magnitude may be indicated by an increase in color density depending on the magnitude, or may be indicated by changing a color to such a color which has a greater tendency to bring an attention depending on the magnitude. Thereby, the user can immediately recognize the degree of the color transition, and can apply the calibration result to the color conversion processing in the image forming apparatus accurately in a short time.

The calibration apparatus for an image forming apparatus, the non-transitory computer readable storage medium recoded with the calibration apparatus program, and the method for calibrating the image forming apparatus according to the second embodiment of the present invention have been described above, and the present embodiment has the following effect.

When determining which of a plurality of gray balances obtained by multiple feedbacks based on the colorimetric value is optimum, the color deviation for each gray balance is displayed so as to detect the number of times of inversions of the sign of the color deviation and the variation width of the color deviation when the sign of the color deviation is inverted in a shorter time. Thereby, the user can determine the degree of the color transition based on at least either the number of times of inversions of the sign of the color deviation or the variation width of the color deviation when the sign of the color deviation is inverted in a short time. Then, the gray balance with a lower degree of the color transition is applied as the gray balance of the image forming apparatus, thereby calibrating the image forming apparatus easily, accurately and in a short time.

The calibration apparatus for the image forming apparatus, the non-transitory computer readable storage medium recorded with the calibration apparatus program, and the method for calibrating the image forming apparatus according to the embodiments of the present invention have been described above, however the present invention is not limited to the aforementioned embodiments.

For example, in the embodiments, the client computer has the function of the color adjustment instruction unit, however the printer controller may have the function of the color adjustment instruction unit.

In the embodiments, the user determines which of a plurality of gray balances obtained by multiple feedbacks based on a colorimetric value of a printed material is applied to the color conversion processing of the image forming apparatus. However, a degree of a color transition is indicated in a numerical value so that the client computer may determine which of gray balances obtained by feedbacks is applied to the color conversion processing of the image forming apparatus. Further, in order to indicate the degree of the color transition in a numerical value, the number of times of inversions of the sign of the color deviation and a variation width of the color deviation when the sign of the color deviation is inverted may be appropriately weighted.

What is claimed is:

1. A calibration apparatus for an image forming apparatus which executes multiple feedbacks to a gray balance of a color value of a printed material by a correction of a color conversion processing of said image forming apparatus based on a measurement result of a color value of the printed material printed by said image forming apparatus, and executes calibration by applying the correction of said color conversion processing at any one of feedbacks to the correction of the color conversion processing of said image forming apparatus according to a selection by a user, the calibration apparatus comprising:

a calculation unit for calculating a color deviation by subtracting a target value from each value on the two orthogonal axes not including brightness of a color coordinate system based on a measured color value of said printed material respectively; and a display unit for displaying said color deviation with respect to each gray balance at said feedback such that the number of times of inversions of a sign of said color deviation calculated by said calculation unit and a variation width of said color deviation when the sign of said color deviation is inverted can be detected.

2. The calibration apparatus for an image forming apparatus as claimed in claim 1, wherein
said target value is a value on the two orthogonal axes not including brightness of a color coordinate system based on a color value of a step patch, and
said display unit continuously displays said color deviation as a graph in order of steps of said step patch.

3. The calibration apparatus for an image forming apparatus as claimed in claim 2, wherein
said step patch comprises of a plurality of patches in which densities of chromatic colors of the patches, where all the chromatic colors among element colors in printing by said image forming apparatus are overlapped at a constant ratio, are changed in a stepwise manner.

4. The calibration apparatus for an image forming apparatus as claimed in claim 1, wherein
said color deviation is at least any of Δa* and Δb* of the CIELAB color space, Δa and Δb of the CIECAM color space, and Δu* and Δv* of the CIELUV color space.

5. The calibration apparatus for an image forming apparatus as claimed in claim 2, wherein
said calculation unit further calculates a hue angle difference by subtracting the target value of a corresponding hue angle from each hue angles based on said measured color values respectively, and
said display unit continuously displays said hue angle differences calculated by said calculation unit in order of steps of said step patch.

6. The calibration apparatus for an image forming apparatus as claimed in claim 1, further comprising:
a determination unit for determining an occurrence of a color transition based on at least either the number of times of inversions of the sign of said color deviation or the variation width of said color deviation when the sign of said color deviation is inverted,
wherein said display unit further displays the occurrence of said color transition when said determination unit determines the occurrence of said color transition.

7. The calibration apparatus for an image forming apparatus as claimed in claim 6, wherein
said determination unit determines a degree of said color transition based on at least either the number of times of inversions of the sign of said color deviation or the variation width of said color deviation when the sign of said color deviation is inverted, and
said display unit further displays the degree of said color transition determined by said determination unit.

8. The calibration apparatus for an image forming apparatus as claimed in claim 1, wherein
said display unit displays said color deviation for said gray balance designated by the user from among said gray balances subjected to said feedbacks, and when said gray balance for which said color deviation is to be displayed is not designated by the user, displays said color deviation for said gray balance subjected to said last feedback.

9. The calibration apparatus for an image forming apparatus as claimed in claim 1, wherein
said calibration includes a feedback to the gray balance of said image forming apparatus based on measurement results of color values of monochrome colors of said printed material and a feedback to the gray balance of said image forming apparatus based on measurement results of color values of overlapped chromatic colors of said printed material, and said display unit displays said color deviation for said gray balance designated by the use from among said gray balances subjected to any of feedbacks.

10. The calibration apparatus for an image forming apparatus as claimed in claim 9, wherein
an instruction to execute a feedback to the gray balance of said image forming apparatus based on measurement results of color values of monochrome colors of said printed material and a feedback to the gray balance of said image forming apparatus based on measurement results of color values of overlapped chromatic colors of said printed material is made in one screen.

11. A non-transitory computer readable storage medium stored with a program for a calibration apparatus which executes calibration by executing multiple feedbacks to a gray balance of a color value of a printed material by a correction of a color conversion processing of an image forming apparatus based on a measurement result of a color value of the printed material printed by said image forming apparatus and applying the correction of said color conversion processing at any one of feedbacks to the correction of the color conversion processing of said image forming apparatus according to a selection by a user, said program causing said calibration apparatus to execute a process comprising:
a procedure (a) of calculating a color deviation by subtracting a target value from each value on the two orthogonal axes not including brightness of a color coordinate system based on a measured color value of said printed material respectively; and
a procedure (b) of displaying said color deviation with respect to each gray balance at said feedback such that the number of times of inversions of a sign of said color deviation calculated in said procedure (a) and a variation width of said color deviation when the sign of said color deviation can be detected.

12. The non-transitory computer readable storage medium as claimed in claim 11, wherein
said target value is on the two orthogonal axes not including brightness of the color coordinate system based on a color value of a step patch, and
said procedure (b) continuously displays said color deviation as a graph in order of steps of said step patch.

13. The non-transitory computer readable storage medium as claimed in claim 12, wherein
said step patch comprises a plurality of patches in which densities of chromatic colors of patches, where all the chromatic colors among element colors in printing by said image forming apparatus are overlapped at a constant ratio, are changed in a stepwise manner.

14. The non-transitory computer readable storage medium as claimed in claim 11, wherein
said color deviation is at least any of Δa* and Δb* of the CIELAB color space, Δa and Δb of the CIECAM color space, and Δu* and Δv* of the CIELUV color space.

15. The non-transitory computer readable storage medium as claimed in claim 12, wherein
said procedure (a) further calculates a hue angle difference by subtracting the target value of a corresponding hue angle from each hue angles based on said measured color values respectively, and
said procedure (b) continuously displays said hue angle difference calculated in said procedure (a) in order of steps of said step patch.

16. The non-transitory computer readable storage medium as claimed in claim 11, said program further causes said calibration apparatus to execute:

a procedure (c) of determining an occurrence of a color transition based on at least either the number of times of inversions of the sign of said color deviation or the variation width of said color deviation when the sign of said color deviation is inverted;

wherein said procedure (b) further displays the occurrence of said color transition when the occurrence of said color transition is determined in said procedure (c).

17. The non-transitory computer readable storage medium as claimed in claim 16, wherein said procedure (c) determines a degree of said color transition based on at least either the number of times of inversions of the sign of said color deviation or the variation width of said color deviation when the sign of said color deviation is inverted, and said procedure (b) further displays the degree of said color transition determined in said procedure (c).

18. The non-transitory computer readable storage medium as claimed in claim 11, wherein said procedure (b) displays said color deviation for said gray balance designated by the user from among said gray balances subjected to said feedbacks, and when said gray balance for which said color deviation is to be displayed is not designated by the user, displays said color deviation for said gray balance subjected to said last feedback.

19. The non-transitory computer readable storage medium as claimed in claim 11, wherein said calibration includes a feedback to the gray balance of said image forming apparatus based on measurement results of color values of monochrome colors of said printed material and a feedback to the gray balance of said image forming apparatus based on measurement results of color values of overlapped chromatic colors of said printed material, and said procedure (b) displays said color deviation for said gray balance designated by the user from among said gray balances subjected to any of feedback.

20. The non-transitory computer readable storage medium as claimed in claim 19, wherein an instruction to execute the feedback to the gray balance of said image forming apparatus based on measurement results of color values of monochrome colors of said printed material and the feedback to the gray balance of said image forming apparatus based on measurement results of color values of overlapped chromatic colors of said printed material is made in one screen.

21. A calibration method for causing a calibration apparatus to execute calibration by executing multiple feedbacks to a gray balance of a color value of a printed material by a correction of a color conversion processing of an image forming apparatus based on a measurement result of a color value of the printed material printed by said image forming apparatus and applying the correction of said color conversion processing at any one of feedbacks to the correction of the color conversion processing of said image forming apparatus according to a selection by a user, the method comprising:

a step (a) of calculating a color deviation by subtracting a target value from each value on the two orthogonal axes not including brightness of a color coordinate system based on said measured color values of said printed material respectively; and a step (b) of displaying said color deviation with respect to each gray balance at said feedback such that the number of times of inversions of a sign of said color deviation calculated in said step (a) and a variation width of said color deviation when the sign of said color deviation is inverted can be detected.

22. The calibration method as claimed in claim 21, wherein said target value is a value on the two orthogonal axes not including brightness of the color coordinate system based on a color values of a step patch, and said step (b) continuously displays said color deviation as a graph in order of steps of said step patch.

23. The calibration method as claimed in claim 22, wherein said step patch comprises a plurality of patches in which densities of chromatic colors of patches, where all said chromatic colors among element colors in printing by said image forming apparatus are overlapped at a constant ratio, are changed in a stepwise manner.

24. The calibration method as claimed in claim 21, wherein said color deviation is at least any of Δa* and Δb* of the CIELAB color space, Δa and Δb of the CIECAM color space, and Δu* and Δv* of the CIELUV color space.

25. The calibration method as claimed in claim 22, wherein said step (a) further calculates a hue angle difference by subtracting the target value of a corresponding hue angle from each hue angles based on said measured color values respectively, and said step (b) continuously displays said hue angle difference calculated in said step(a) in order of steps of said step patch.

26. The calibration method as claimed in claim 21, further comprising:

a step (c) of determining an occurrence of a color transition based on at least either the number of times of inversions of the sign of said color deviation or the variation width of said color deviation when the sign of said color deviation is inverted, wherein said step (b) further displays the occurrence of said color transition when said occurrence of said color transition is determined in said step (c).

27. The calibration method as claimed in claim 26, wherein said step (c) determines a degree of said color transition based on at least either the number of times of inversions of the sign of said color deviation or the variation width of said color deviation when the sign of said color deviation is inverted, and said step (b) further displays the degree of said color transition determined in said step (c).

28. The calibration method as claimed in claim 21, wherein said step (b) displays said color deviation for said gray balance designated by the user from among said gray balances subjected to said feedbacks, and when said gray balance for which said color deviation is to be displayed is not designated by the user, displays said color deviation for said gray balance subjected to said last feedback.

29. The calibration method as claimed in claim 21, wherein said calibration includes a feedback to the gray balance of said image forming apparatus based on measurement results of color values of monochrome colors of said printed material and a feedback to the gray balance of said image forming apparatus based on measurement results of color values of overlapped chromatic colors of said printed material, and said step (b) displays said color deviation for said gray balance designated by the user from among said gray balances subjected to any of feedback.

30. The calibration method as claimed in claim 29, wherein an instruction to execute the feedback to the gray balance of said image forming apparatus based on measurement results of color values of monochrome colors of said printed material and the feedback to the gray balance of said image forming apparatus based on measurement results of color values of overlapped chromatic colors of said printed material is made in one screen.

* * * * *